(12) United States Patent
Lawes

(10) Patent No.: US 7,490,482 B2
(45) Date of Patent: Feb. 17, 2009

(54) ABSORPTION SPACE COOLER WITH NO FORCED PUMPING

(76) Inventor: Roland C. Lawes, Apoo- 092300202, Santiago, Veraguas (PA)

( * ) Notice: Subject to any disclaimer, the term of this patent is extended or adjusted under 35 U.S.C. 154(b) by 236 days.

(21) Appl. No.: 11/526,377

(22) Filed: Sep. 23, 2006

(65) Prior Publication Data
US 2008/0072618 A1    Mar. 27, 2008

(51) Int. Cl.
F25B 15/00    (2006.01)

(52) U.S. Cl. ............... 62/476; 62/480; 62/481; 62/484

(58) Field of Classification Search ............ 62/476, 62/484, 481, 480
See application file for complete search history.

(56) References Cited

U.S. PATENT DOCUMENTS

| | | | |
|---|---|---|---|
| RE17,406 E | * | 8/1929 | Bornhauser ............ 62/147 |
| 3,555,841 A | | 1/1971 | Modahl |
| 3,617,153 A | * | 11/1971 | Mowry ............ 417/241 |
| 3,707,851 A | | 1/1973 | McAshan, Jr. |
| 3,811,292 A | | 5/1974 | Hoenisch |
| 3,815,379 A | | 6/1974 | Scherer et al. |
| 3,817,050 A | | 6/1974 | Alexander et al. |
| 3,986,341 A | | 10/1976 | DeHaan |
| 4,085,595 A | | 4/1978 | Saito et al. |
| 4,183,228 A | | 1/1980 | Saito et al. |
| 4,363,219 A | | 12/1982 | Koseki et al. |
| 4,475,353 A | | 10/1984 | Lazare |
| 4,700,545 A | | 10/1987 | Ishibashi et al. |
| 4,788,829 A | | 12/1988 | Takemasa et al. |
| 4,991,404 A | | 2/1991 | Yassa |
| 5,181,391 A | | 1/1993 | Manz |
| 5,943,686 A | | 8/1999 | Arimilli et al. |
| 2005/0044864 A1 | | 3/2005 | Manole et al. |
| 2005/0132724 A1 | | 6/2005 | Sharma et al. |

* cited by examiner

Primary Examiner—Zelalem Eshete
Assistant Examiner—Stephanie McLaren
(74) Attorney, Agent, or Firm—Craig W. Barber

(57) ABSTRACT

A two-liquid absorption refrigerator or space cooler of the cyclic type uses a spiral shaped Bourdon Tube as the refrigerant gas generator, with the lower end of the spiral disposed at a heat source. The generator may also function as the absorber vessel, thus greatly simplifying the operation of the device. In use, when ammonia depletion during the cooling cycle allows the generator to heat, it moves its lower end to a position removed from the heat source and begins to cool, thus allowing a charging cycle to replenish ammonia into the absorption liquid (usually water) in the generator. The device may thus function with only one moving part and without electricity, and further without control over the heating source.

10 Claims, 6 Drawing Sheets

ABSORPTION SPACE COOLER WITH NO FORCED PUMPING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to refrigeration devices, and specifically to gas absorption refrigeration devices.

STATEMENT REGARDING FEDERALLY FUNDED RESEARCH

This invention was not made under contract with an agency of the US Government, nor by any agency of the US Government.

BACKGROUND OF THE INVENTION

Gas absorption refrigerators/space coolers are commonly used in areas with erratic or no electricity in order to provide cooling or refrigeration. The principle of operation is that a gas may be absorbed into a liquid (thus the name), then boiled out as needed, sent through an expansion process to produce adiabatic cooling via the Joule-Thomson or Joule-Kelvin effect: the expanding gas cools, then passes through cooling coils which provide a net cooling output from the overall device. After the expansion, the gas must be absorbed again.

There are various types of gas absorption refrigerators: single working fluid types, double working fluid types, gravity feed devices using no pumps, cyclic and continuous and so on. The cyclic type having a fluid, a gas and an electrically driven pump is easiest to produce but is fairly complex: an electrically driven pump (or compressor) is the operative moving part in traditional refrigerators/air conditioners and thus to a certain extent it's presence defeats the advantages of a gas absorption refrigerator in the first place.

The internal workings of traditional gas absorption refrigerators will be discussed in detail in reference to FIG. 1 in the DETAILED DESCRIPTION portion of this application.

Searching in the collection of the US Patent and Trademark Office reveals certain items of interest.

US Patent Publication No. 2005/0132724 published Jun. 23, 2005 in the name of Sharma et al teaches a gas absorption device which uses multiple stages or "multiple effect" operation in order to attempt to produce higher efficiencies and reduced heat requirements. U.S. Pat. No. 4,183,228 issued Jan. 15, 1980 to Saito et al is similar in basic principle of double stage operation, as does U.S. Pat. No. 4,085,595 issued Apr. 25, 1978 to Saito et al.

US Patent Publication No. 2005/0044864 published Mar. 3, 2005 in the name of Manole et al teaches a fluid flow design in which a working fluid may expand or contract based upon heat input thereto.

U.S. Pat. No. 5,943,686 issued Aug. 21, 1999 in the name of Dietz et al teaches a gas absorption device using solar energy and a continuous cycle of operation, without a moving generator or combined generator/absorber structure.

U.S. Pat. No. 3,986,341 issued Oct. 19, 1976 to DeHann teaches a spiral winding for a low heat loss heat shield.

U.S. Pat. No. 4,363,219 issued Dec. 14, 1982 to Koseki et al teaches a gas absorption device which uses a three liquid system: the intermediate liquid has favorable thermodynamic properties for the system.

U.S. Pat. No. 5,181,391 issued Jan. 26, 1993 to Manz teaches a conventional (non-gas absorption) refrigeration handling system which happens to have a pressure gauge thereon and extra refrigerant handling equipment, as does U.S. Pat. No. 5,063,749 issued Nov. 12, 1991 to the same inventor.

U.S. Pat. No. 4,788,829 issued Dec. 6, 1988 to Takemasa et al teaches another two-stage system of mixed refrigerant type.

U.S. Pat. No. 4,700,545 issued Oct. 20, 1987 to Ishibashi et al teaches a pair of mechanically driven expansion spaces for a refrigerator device.

U.S. Pat. No. 4,475,353 issued Oct. 19, 1984 to Lazare teaches a serial gas absorption system offering low temperatures but using various electrical and controlled parts. U.S. Pat. No. 3,817,050 issued to Alexander et al on Jun. 18, 1974 actually teaches a three stage device.

U.S. Pat. No. 3,815,379 to Hoenisch issued Jun. 11, 1974 teaches a device having a fan control system, the fan and system are both electrical, as does U.S. Pat. No. 3,811,292 to the same inventor on May 21, 1974, and U.S. Pat. No. 3,707,851 issued to McAshan, Jr. on Jan. 2, 1973, and U.S. Pat. No. 4,991,404 issued Feb. 12, 1991 to Yassa.

U.S. Pat. No. 3,555,841 issued on Jan. 19, 1971 to Modahl et al teaches a corrosion resistant method and a large and complex industrial gas absorption device.

All of these devices in the gas absorption field teach in the direction of increased complexity, multiple stages to increase efficiency, serial refrigeration systems to increase output, complex controls and so on. Devices not relevant to gas absorption technology teach heat shielding and the like. None teach in the direction of simpler, physically automatic and therefore autonomous refrigeration systems which require no electricity at all to operate in a non-continuous mode.

It would be preferable to provide a gas absorption device which does not require electrical control over any part of the operation, does not require control over the heat source, does not require electricity supply to a pump or fan, and yet can operate autonomously in a cyclic mode of operation.

It would be preferable to provide a gas absorption device able to use the heat source to move the working parts as needed to maintain efficient cyclic operation.

It would further be preferable to provide a gas absorption refrigeration/cooling device having high efficiency of operation.

It would further be preferable to provide a gas absorption device able to use a single vessel as both generator and absorptive chamber, with a wide variety of working and absorptive liquids.

Finally, it would be preferable to provide a gas absorption device offering easy construction and maintenance.

SUMMARY OF THE INVENTION

General Summary

The present invention teaches that a two-liquid absorption refrigerator/space cooler may use a heat sensitive material for the generator, so that a cyclic application of heat to the generator may be achieved without electrically powered moving parts and/or without control of the heat source, that is, heat control may be optional.

The principle of the Bourdon Tube is applied. As is known, a Bourdon Tube may be a pressure or temperature sensitive tube which reacts to internal pressure (for example in response to external heat applied to the tube) by straightening. Common applications of Bourdon Tubes include gauges for temperature or pressure.

In the present invention the refrigerant gas generator vessel is dimensioned and configured so as to react to the application of external heat/internal pressure by altering from a first shape to a second shape. If one portion of the vessel is fixed, the result is that one particular portion must move to achieve the second shape. If the reservoir containing the absorptive liquid (such as water) is the part that moves then the generator may also function as the absorber vessel, thus greatly simplifying the operation of the device.

In use, when ammonia depletion during the cooling cycle eventually allows the generator to heat above the boiling point of the ammonia or other working fluid. If the generator has been designed so that it does not move until a temperature above the boiling point of the working fluid/gas (and below or near the boiling point of the absorptive liquid/water) then after working gas depletion from the generator it will move itself to a position removed from the heat source.

As the generator begins to cool, a charging cycle may replenish ammonia or other working gas/fluid into the absorbent liquid (usually water) in the generator.

Since not only cooling via expansion of working fluid into gas but also movement of the generator is accomplished using the heat from the heat source acting on the Bourdon Tube generator/absorber, there is no violation of fundamental thermodynamic principles: considerable energy enters the system to power the cooling cycle.

During cooling, the reflexive return of the generator to its cooled shape and position returns it to the heat source for a new cooling cycle to begin. The device may thus function with only one moving part and without electricity, and further without control over the heating source.

In the presently preferred embodiment, the device may be equipped with a spring and detent to prevent small motions of the generator in response to heating and cooling. However, application of sufficient force by the generator overcomes this resistance and the spring and detent device then impels the generator into a second position and urges it to remain there against applications of modest force. (Residential light switches of the mechanical type operate based upon similar mechanical structures.)

SUMMARY IN REFERENCE TO CLAIMS

It is therefore a first aspect, advantage, objective and embodiment of the invention to provide a gas absorption space cooler comprising:
- a spiral, substantially tubular generator-absorber chamber having upper and lower check valves, the upper check valve oriented to allow gas to flow out of the generator-absorber chamber but not in, the lower check valve oriented to allow gas to flow into the generator-absorber chamber but not out,
- the generator-absorber chamber made of a material sensitive to internal pressure within the generator-absorber chamber; whereby
- when a first level of pressure is present in the generator-absorber chamber the generator-absorber chamber assumes a first spiral shape, and when a second level of pressure is present in the generator-absorber chamber the generator-absorber chamber assumes a second shape, a first portion of the generator-absorber chamber disposed at a first location when the generator-absorber chamber assumes the first spiral shape and disposed at a second location when the generator-absorber chamber assumes the second shape;
- a heat source disposed at the first location, the heat source in thermodynamic communication with the first portion of the generator-absorber chamber;
- a condenser fluidically communicating via the upper check valve with the generator-absorber chamber, the condenser having an expansion valve;
- an evaporator fluidically communicating via the expansion valve with the condenser, and further fluidically communicating via the lower check valve with the generator-absorber chamber.

It is therefore another aspect, advantage, objective and embodiment of the invention to provide a gas absorption space cooler/refrigerator wherein the generally spiral, substantially tubular generator-absorber chamber has a cross section which is slightly elliptical.

It is therefore another aspect, advantage, objective and embodiment of the invention to provide a gas absorption space cooler/refrigerator having a coaxial perforated tube disposed within the substantially tubular generator-absorber chamber.

It is therefore another aspect, advantage, objective and embodiment of the invention to provide a gas absorption space cooler/refrigerator wherein the substantially tubular generator-absorber chamber first portion has a reservoir of liquid disposed therein.

It is therefore another aspect, advantage, objective and embodiment of the invention to provide a gas absorption space cooler/refrigerator wherein the liquid comprises a mixture of ammonia and water.

It is therefore another aspect, advantage, objective and embodiment of the invention to provide a second generally spiral, substantially tubular generator-absorber chamber identical to the first generator-absorber chamber, with the first portion of the second generator-absorber also disposed at the first location, whereby when the first generator-absorber chamber is cooling, the second generator-absorber chamber is heating.

It is therefore another aspect, advantage, objective and embodiment of the invention to provide a gas absorption space cooler/refrigerator further comprising:
- at least one spring and at least one detent, the spring and detent cooperating to urge the first portion to remain at the first location with a first force, the spring and detent cooperating to urge the first portion to the second location when the first force is overcome.

It is therefore another aspect, advantage, objective and embodiment of the invention to provide a gas absorption space cooler/refrigerator wherein the spring and detent cooperate to urge the first portion to remain at the second location with a second force, the spring and detent cooperating to urge the first portion to the first location when the second force is overcome.

It is therefore another aspect, advantage, objective and embodiment of the invention to provide a gas absorption space cooler/refrigerator wherein the condenser further comprises: a receiver for condensing ammonia.

It is therefore another aspect, advantage, objective and embodiment of the invention to provide a gas absorption space cooler/refrigerator further comprising:

a heat exchanger acting to extract heat from condenser condensate entering the receiver by heat exchange with evaporative cooler outlet gas.

INDEX TO REFERENCE NUMERALS

| PRIOR ART Gas absorption | |
| --- | --- |
| refrigerator/space cooler | 100 |
| Heat source | 102 |
| Generator | 104 |
| Condenser | 106 |
| Evaporator | 108 |
| Absorber | 110 |
| Pump | 112 |
| Gas absorption refrigerator/space cooler | 200 |
| Heat source | 202 |
| Condenser | 206 |
| Evaporator | 208 |
| Generator/absorber | 220 |
| Check valve | 222 |
| Check valve | 224 |
| Heat source | 302 |
| Condenser | 306 |
| Evaporator | 308 |
| Generator/absorber | 320 |
| Check valve | 322 |
| Check valve | 324 |
| Bi-liquid reservoir | 330 |
| Flue | 332 |
| Heat exchanger | 334 |
| Receiver | 336 |
| Expansion valve | 338 |
| Generator/absorber | 420 |
| Bi-liquid reservoir | 430 |
| GA tube interior | 440 |
| Perforated tube | 442 |
| Slightly flattened cross section in coil | 444 |
| Feed conduit from evaporator (via check valve) | 446 |
| Cooling/ammonia cycle state | 501 |
| Ammonia cycle and cooling | 502 |
| Cooling (output)/generator heating state | 503 |
| Generator/absorber tube snap away from heat | 504 |
| Absorption/generator cooling state | 505 |
| Ammonia absorption (no output cooling) | 506 |
| Absorption/generator cooling state | 507 |
| Generator/absorber tube snaps over heat | 508 |
| Solid support | 660 |
| Retainer | 662 |
| Spring | 664 |
| Detent | 668 |

DETAILED DESCRIPTION

Figure 1:
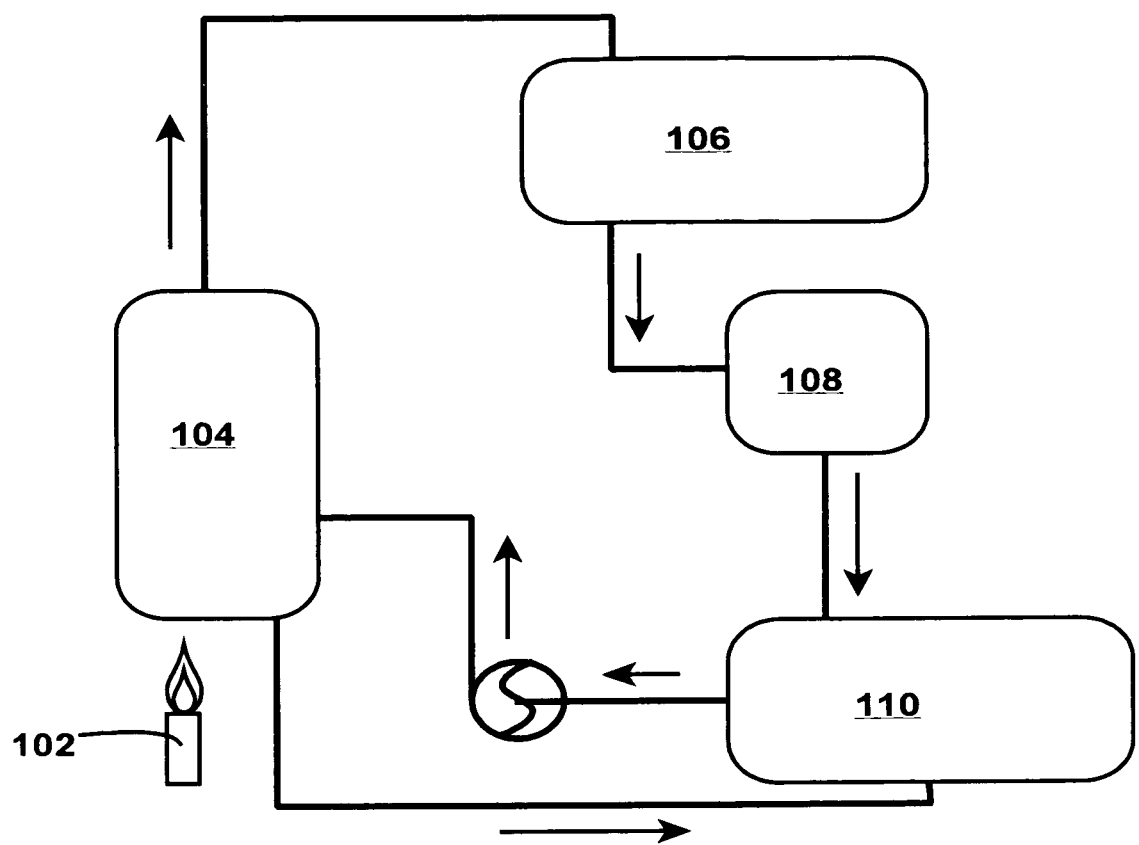
FIG. 1 is a schematic block diagram of PRIOR ART gas absorption space coolers/refrigerators.

FIG. 1 is a schematic block diagram of PRIOR ART gas absorption space coolers/refrigerators. PRIOR ART Gas absorption refrigerator/space cooler 100 has four main containers for the combinations of fluids and gases flowing within it. Heat source 102 provides heat energy to the generator vessel 104, a container which normally has two liquids mixed therein in a non-azeotropic mixture, that is, a mixture in which the vapor produced on application of heat is primarily one of the two fluids. The two liquids may have very different thermodynamic properties, in particular, one liquid will have a low boiling point ("low boiler" or "working fluid") in comparison to the other liquid (the "high boiler" or absorption liquid). When heat is added to generator 104, the temperature of the generator container will rise to a "boiling point" of the working fluid, however, this is an oversimplification as the temperature will actually rise to a variable temperature determined by the momentary mixture of the working and absorption liquids, the pressure and other variables and so on. As the temperature rises, more and more of the working fluid leaves the fluid mix and is thus "generated" as a gas in the generator chamber. It is then allowed to pass through a conduit to a condenser 106 in which it condenses back into liquid form, now in a state of comparative refinement: the absorption fluid will normally be present in the condenser 106 in only very small amounts.

Passing through a conduit to evaporator 108, the working liquid is now throttled so as to expand endothermically, thus undergoing Joule-Kelvin cooling. (Note that state changes of the fluid absorb more BTUs of energy than the pressure drop alone.) If the evaporator 108 is placed in a space to be cooled such as a room or refrigerator box, or if it in turn communicates with a brine solution or other the like, a net cooling output from the device is achieved.

Thereafter, the working fluid may pass via conduits to absorber 110, where the working fluid is absorbed into the absorption fluid. This recharging may occur continuously in certain types of systems, normally those having a control system and devices such as pump 112 to provide motion of the fluids as desired. A limited amount of "weak liquid" is allowed to flow from the bottom of the generator to replenish what is pumped from the absorber.

In passing, it will be noted that as the non-azeotropic mixture in the generator is necessarily changing composition during the "distillation" or "ebullation" of the mixture: the "low boiler" working fluid leaves the liquid and the combined boiling temperature rises slightly towards the boiling point of the "high boiler" absorption fluid. As a natural result, the temperature of the generator rises as the working fluid becomes depleted.

Figure 2:
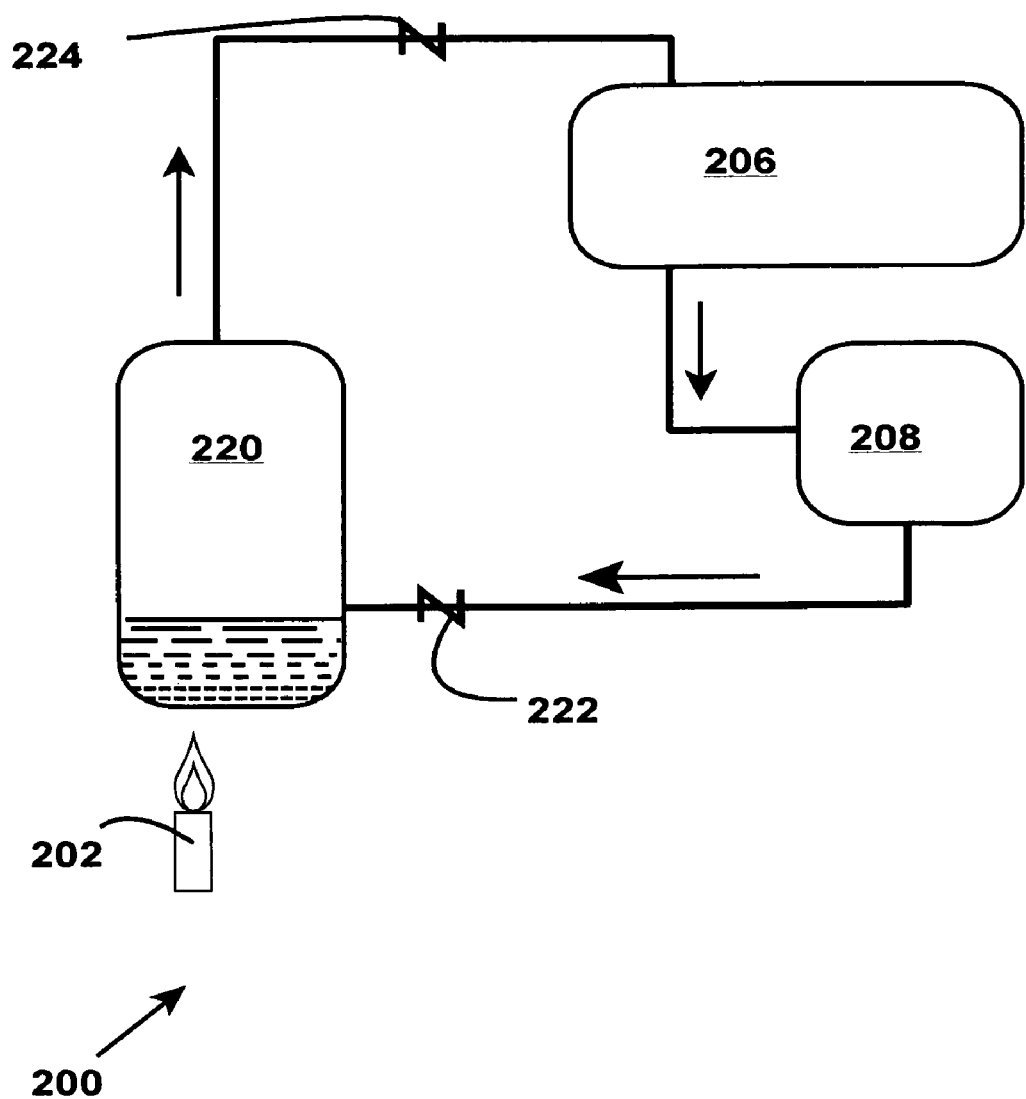
FIG. 2 is a schematic block diagram at theory level of a gas absorption space cooler/refrigerator according to the invention.

FIG. 2 is a schematic block diagram at theory level of a gas absorption space cooler/refrigerator according to the present invention. The absorption fluid may be water, which is customarily used in smaller gas absorption systems, but it is not limited to water and other known absorbents, liquid or otherwise, now known or later developed or exotic, may all be used as well. The working fluid herein will be referred to as ammonia, but other working mixtures now known or later developed may be used without altering the principles of operation of the device. Finally, a third gas may be used in order to produce higher partial pressures suitable for prompt absorption of the working fluid by the absorption fluid: hydrogen is quite often used for this purpose in small gas absorption systems, but other gases may be used as well. Thus, while the system may be described as a water-ammonia or water-ammonia-hydrogen or water-lithium bromide system (though water-lithium bromide is not a preferred embodiment), it is very definitely not limited to these particular choices of working fluids/gases. The term "fluid" as used herein may refer to any fluidic substance in either fluid or gas form. The term "ammonia" and the term "water" may be used to stand in for the unwieldy phrases "working fluid" and "absorption fluid".

Gas absorption refrigerator/space cooler 200 has three major containers, conduits providing normal fluidic communication between them, non-return valves and a heat source.

Heat source 202 is depicted to be a typical gas jet, such as is commonly used in gas absorption refrigerators. The gas jet may be quite large, or it may even be quite small, even as small as a pilot light in smaller cooler embodiments. The rationale for such use is that in many areas electrical power is erratic or unavailable while gas power, especially from small house hold supply tanks, is relatively reliable and cheap. However, the heat source 202 is not so limited. In particular, it will be appreciated that there are places and mechanisms in which a steady or even unvarying source of heat is available, for example, solar collectors, geothermal hot spots and so on. In such cases, it may well be impracticable to have the heat source shut off, but it may be very desirable instead to have the generator actually move away from the heat source.

In the present invention, the generator/absorber 220 functions as both a generator and an absorber during a complete cycle of cooling and charging. Thus, it takes turns discharging working fluid while being heated and taking in working fluid while being allowed to cool.

Condenser 206 is fed normally by working fluid generated by the generator/absorber 220 is cooled by direct or indirect heat exchange, and in turn feeds evaporator 208 via an expansion valve as discussed previously, endothermically cooling evaporator 208 and its surroundings.

When generating the condenser and receiver will have pressure only slightly less than that of the generator, and after removal from the heat source, the condenser will very promptly have more pressure than the generator (at the same temperature) due to reabsorption of gas as the generator cools. (The check valve will prevent back flow which would otherwise cancel the effectiveness of the flow.)

Check valve 222, or "upper check valve" may prevent backflow of working fluid in either gas or fluid state from the condenser 206 to the generator/absorber 220. Check valve 222 ("lower check valve") on the other hand may function to prevent flow from the generator/absorber 220 to the evaporator 208. The designations upper and lower for the check valves are based upon gravity feed systems, in other configurations of the device, the valves may be "first and second" valves, "left and right" and so on.

Figure 3:
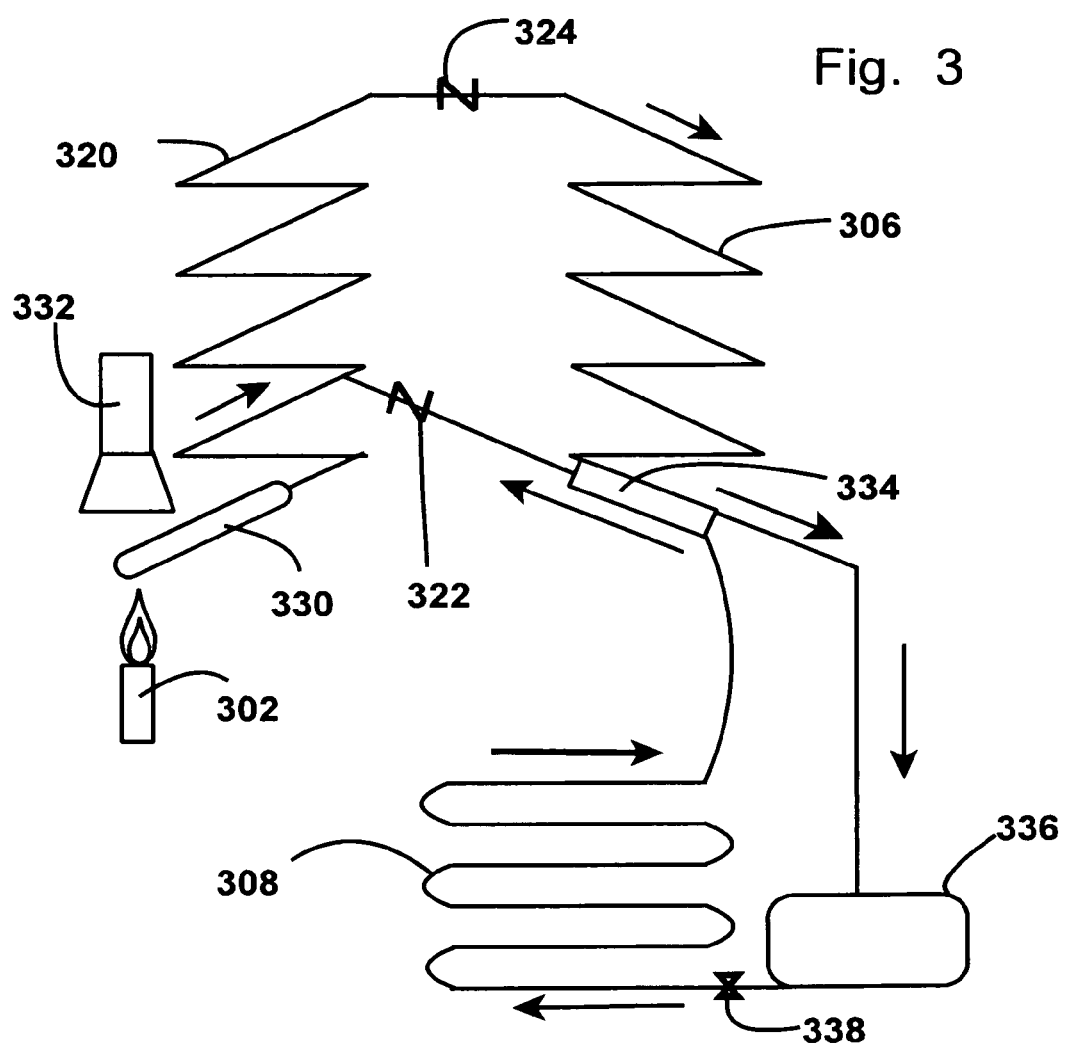
FIG. 3 is a block diagram of a gas absorption space cooler/refrigerator according to a first embodiment of the invention.

The mechanisms allowing generator/absorber 220 ("GA") to operate in both modes will now be explained in further detail by reference to FIG. 3, which is a block diagram of a gas absorption space cooler/refrigerator according to a first embodiment of the invention.

The gas absorption refrigerator/space cooler has heat source 302, where condenser 306 and evaporator 308 are in the form of elongated tubular chambers. In embodiments, generator/absorber 320 and condenser 306 may both be spirals of tubing. In the case of the GA 320, the tubing may be slightly flattened into an elliptical cross-section. In embodiments, space may actually be saved by having generator/absorber 320 and condenser 306 spiral co-axially in the same space, provided sufficient airflow is present to prevent generator/absorber 320 from heating condenser 306 to a temperature which reduces efficiency of the system.

Generator/absorber 320 is made of a material compatible with the elastic requirements of the present invention, that is the material (for example steel) must be capable of assuming its original shape after being deformed by internal pressure, that is, the generator/absorber 320 in whole or in part, may be considered to be a large Bourdon Tube. This is in contrast to known generators.

Generator/absorber 320 may be seen to be a helical or spiraled Bourdon Tube and thus, as the working fluid is depleted from the mixed fluids within the bottom end of the generator/absorber, the temperature of the generator/absorber will begin to rise and the generator/absorber will in and of itself begin to generate pressure to "unspiral" or straighten. It will be appreciated that if parts of the device are fixed in place so that they cannot move, then the remaining parts will be the parts which move. In the present invention, the lower portion comprising the reservoir of mixed liquids is the part which is allowed to move, and it moves in relation to the heat source. Thus with proper control of the physical variables involved, the device may move itself (the reservoir portion) when the temperature exceeds the temperature at which significant working gas is being generated, that is, when the working fluid is almost depleted from the reservoir of mixed fluids and the device needs to enter a recharging cycle.

Bi-liquid reservoir 330 may simply be a wider place in the spiral tubular generator/absorber 320, or it may be a conical shape, a generally spherical shape or another shape as may be desirable.

Check valve 322 allows flow from the evaporator 308 to the generator/absorber 320 but not back flow, while check valve 324 allows one way flow from the generator/absorber 320 to the condenser 306 but not back flow.

Flue 332 may be used to remove combustion products generated by heat source 302 via a chimney, isolating heat from the upper section of the generator/absorber.

Heat exchanger 334 may increase the efficiency of the device by exchanging heat between condenser 306 after the stage at which most actual condensation has taken place and evaporator 308 which is cooler than 306 but no longer cool enough to furnish useful refrigeration. Thus heat may be moved in beneficial directions, in particular, towards the generator/absorber in which heat is generally desirable.

Receiver 336 collects condensed working fluid from the condenser 306 in order to provide a supply of liquid ready for expansion in the low pressure evaporator 308. As noted, this working fluid contains a relatively low level of the absorption fluid. Expansion valve 338 then allows the endothermic expansion of the working fluid which creates the cooling of evaporator 308, that is, the actual output of the space cooler/refrigerator device.

Figure 4:
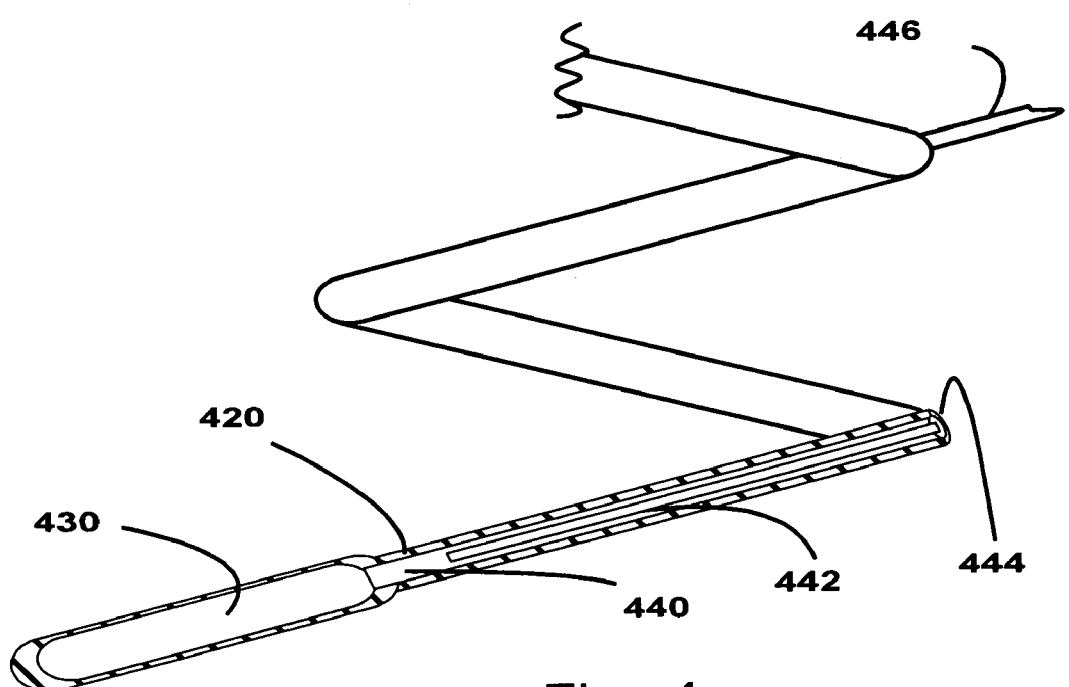
FIG. 4 is a partially cross-sectional side view of a second embodiment of the invention.

FIG. 4 is a partially cross-sectional side view of a second embodiment of the invention. Generator/absorber 420 has bi-liquid reservoir 430 inside of the hollow, generally tubular body indicated as GA tube interior 440. Perforated tube 442 may be disposed within the generator/absorber tube interior in order to promote the mingling of evaporator exit gas with weak liquid in the generator/absorber when in the absorption stage.

Slightly flattened cross section 444 may be seen: the generator/absorber 420 need not be an exact tube, and in fact may in other embodiments be generally "still" shaped, or in yet other embodiments may have a wide range of shapes. However, in the presently preferred embodiment and best mode presently contemplated for carrying out the invention, a flattened tube is preferred as having advantageous thermoplastic and thermodynamic properties. Feed conduit from evaporator (via check valve) 446 is the working fluid return line: the working fluid, at that stage in a gas state, will pass through the lower check valve (FIG. 3) and return to the generator/absorber tube during the recharge cycle, thus making itself available for absorption by the absorption fluid inside of the generator/absorber 420.

Figure 5:
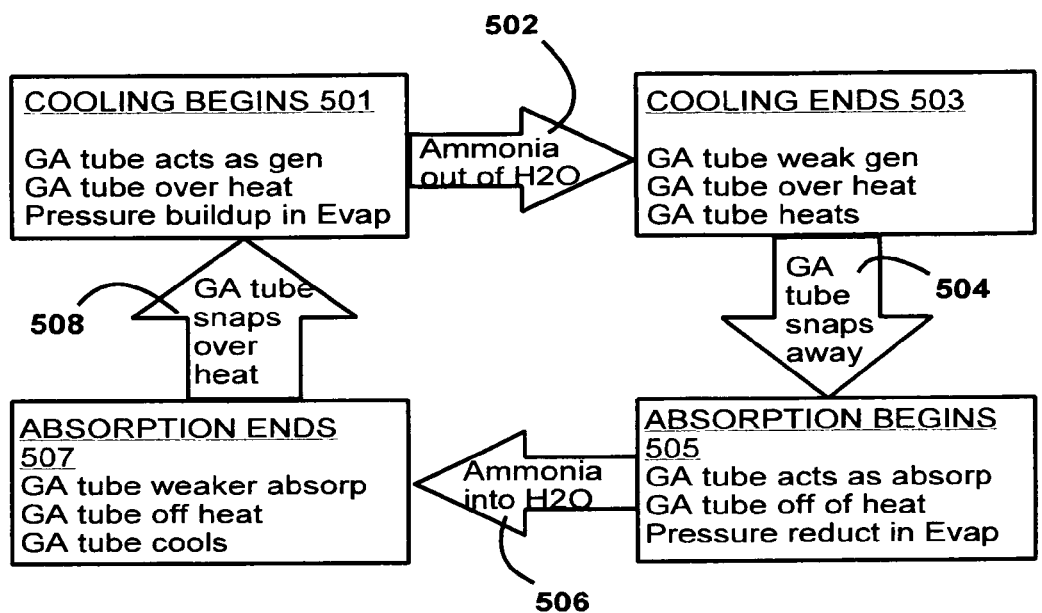
FIG. 5 is a chart of the "charging", "cooling", and two intermediate states of the invention during operation.

FIG. 5 is a chart of the "charging" state, "cooling" state, and two intermediate states of the invention during operation. Cooling/ammonia cycle state 501 is the "operation" state of the invention: the generator/absorber (severely abbreviated for the chart) is acting as a generator of the working fluid as it absorbs heat in its position at the heat source, and pressure is building in the evaporator as it is used for cooling.

Ammonia cycle and cooling 502, however, is depleting the working fluid (ammonia in the chart of FIG. 5), so that a cooling (output)/generator heating state 503 is attained in which cooling continues but also allowing the generator to produce weaker generation of the working fluid and allowing the generator to heat as it remains above the heat source.

Eventually, the strain building up in the generator/absorber builds to the point that it overcomes the spring and detent holding it in place and the generator/absorber tube snaps away from the heat source 504.

Absorption/generator cooling state 505, a recharging cycle, now begins. The generator/absorption tube cools to a temperature such that absorption begins, since it is no longer located at the heat source, and pressure in the evaporator begins to go down.

Ammonia absorption (no output cooling) 506 continues to occur, leading to slower and slower recharging and lower and lower temperatures in the generator/absorber. Absorption/generator cooling state 507 finds the generator/absorber tube still weakly absorbing working fluid as it finishes cooling, but eventually the strain building up in the generator/absorber builds up until it again overcomes the resistance of the retaining mechanism, and the generator/absorber tube snaps back over the heat 508, leading to a new cooling/working cycle.

In practice, a cup and stop mechanism may be used to control motion of the Bourdon Tube lower end. The cup-shaped retaining device is fastened to a fixed pin by a bushing, the GA lower end then passes through the cup-shaped retainer and is fastened thereto. By this means, the lower end may rotate about the pin in the horizontal plane but may not move vertically. A stop prevents motion too far in the direction of the heat source. The result is that as pressure causes the GA to flex, the lower end may move in and out of the heat source.

Figure 6:
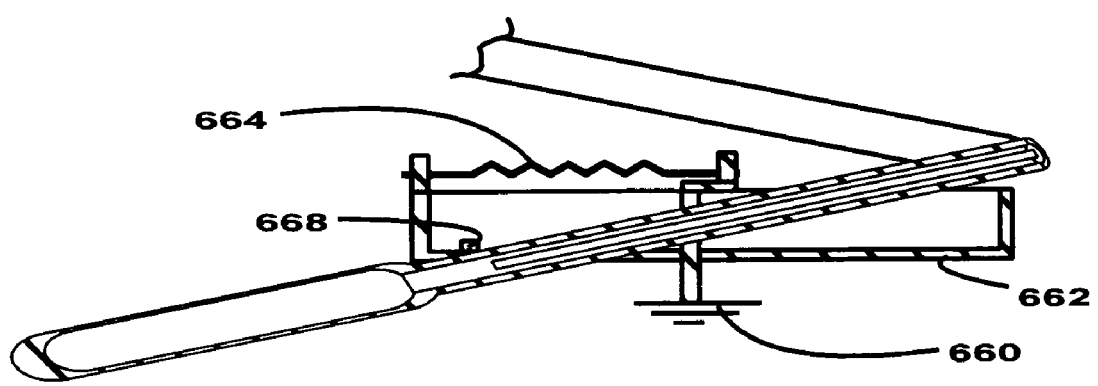
FIG. 6 is a partially cross-sectional view of a spring and detent mechanism according to the invention.

Note that temperature could be used in alternative embodiments and such embodiments are covered within the scope of this invention. FIG. 6 is a partially cross-sectional view of an alternative embodiment spring and detent mechanism according to the invention spring 664 and detent 668 cooperate to urge the generator/absorber lower end to stay at a first location until such time as the buildup of strain (due to either pressure in preferred embodiments or temperature in alternative embodiments) is sufficient to overcome the spring force urging it into the first location. When pressure/temperature moderates, the device may return to the first location. It will be appreciated that the first location may have a heat source. In embodiments, the arrangement of spring and detent may be different. Importantly, in embodiments it may be possible to omit either or both of spring and detent and rely on the property of the Bourdon Tube GA to provide the correct locations.

Note that the invention may comprise a second generator-absorber disposed over the same heat source at the first location, or even a plurality of GA Bourdon Tubes disposed over a single heat source. In practice, the first portions (lower ends) of the GA bodies may be arranged so as to alternate time over the heat source.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A gas absorption space cooler/refrigerator comprising:
   a generally spiral, substantially tubular generator-absorber chamber having upper and lower check valves, the upper check valve oriented to allow gas to flow out of the generator-absorber chamber but not in, the lower check valve oriented to allow gas to flow into the generator-absorber chamber but not out,
   the generator-absorber chamber made of a material sensitive to internal pressure within the generator-absorber chamber; whereby
   when a first level of pressure is present in the generator-absorber chamber the generator-absorber chamber assumes a first spiral shape, and when a second level of pressure is present in the generator-absorber chamber the generator-absorber chamber assumes a second shape, a first portion of the generator-absorber chamber disposed at a first location when the generator-absorber chamber assumes the first spiral shape and disposed at a second location when the generator-absorber chamber assumes the second shape;
   a heat source disposed at the first location, the heat source in thermodynamic communication with the first portion of the generator-absorber chamber;
   a condenser fluidically communicating via the upper check valve with the generator-absorber chamber, the condenser having an expansion valve;
   an evaporator fluidically communicating via the expansion valve with the condenser, and further fluidically communicating via the lower check valve with the generator-absorber chamber.

2. The gas absorption space cooler/refrigerator of claim 1, wherein the generally spiral, substantially tubular generator-absorber chamber has a cross section which is slightly elliptical.

3. The gas absorption space cooler/refrigerator of claim 1, having a coaxial perforated tube disposed within the substantially tubular generator-absorber chamber.

4. The gas absorption space cooler/refrigerator of claim 1, wherein the substantially tubular generator-absorber chamber first portion has a reservoir of liquid disposed therein.

5. The gas absorption space cooler/refrigerator of claim 4, wherein the liquid comprises a mixture of ammonia and water.

6. The gas absorption space cooler/refrigerator of claim 1, further comprising a second generally spiral, substantially tubular generator-absorber chamber identical to the first generator-absorber chamber, with the first portion of the second generator-absorber also disposed at the first location, whereby when the first generator-absorber chamber is cooling, the second generator-absorber chamber is heating.

7. The gas absorption space cooler/refrigerator of claim 1, further comprising:
   at least one spring and at least one detent, the spring and detent cooperating to urge the first portion to remain at the first location with a first force.

8. The gas absorption space cooler/refrigerator of claim 7, wherein the spring and detent cooperate to urge the first portion to remain at the second location with a second force, the spring and detent cooperating to urge the first portion to the first location when the second force is overcome.

9. The gas absorption space cooler/refrigerator of claim 1, wherein the condenser further comprises: a receiver for condensing ammonia.

10. The gas absorption space cooler/refrigerator of claim 9, further comprising:
a heat exchanger acting to extract heat from condenser condensate entering the receiver by heat exchange with evaporative cooler outlet gas.

* * * * *